United States Patent [19]

Aizawa et al.

[11] Patent Number: 5,582,145
[45] Date of Patent: Dec. 10, 1996

[54] FOUR-STROKE-CYCLE ENGINE

[75] Inventors: Shigemitsu Aizawa; Naohiro Maruyama; Yuichi Momose, all of Nagano, Japan

[73] Assignee: Ishikawajima-Shibaura Machinery Co., Ltd., Tokyo, Japan

[21] Appl. No.: 559,292

[22] Filed: Nov. 15, 1995

[30] Foreign Application Priority Data

May 11, 1995 [JP] Japan .................................. 7-112188

[51] Int. Cl.[6] .................................................. F01M 13/00
[52] U.S. Cl. .................................. 123/196 CP; 123/572
[58] Field of Search .......................... 123/196 R, 196 CP, 123/196 M, 196 W, 311, 572, 573

[56] References Cited

U.S. PATENT DOCUMENTS

| | | | |
|---|---|---|---|
| 4,493,295 | 1/1985 | Ampferer | 123/196 CP |
| 4,969,434 | 11/1990 | Nakagawa | 123/196 M |
| 5,193,500 | 3/1993 | Haft | 123/196 CP |
| 5,279,269 | 1/1994 | Aizawa et al. | 123/317 |

FOREIGN PATENT DOCUMENTS

| | | | |
|---|---|---|---|
| 0631040 | 12/1994 | European Pat. Off. | 123/196 CP |
| 3-249317 | 11/1991 | Japan | 123/196 CP |
| 6-1146837 | 5/1994 | Japan | 123/196 CP |
| 06346718 | 12/1994 | Japan . | |
| 07034838 | 2/1995 | Japan . | |

*Primary Examiner*—David A. Okonsky
*Attorney, Agent, or Firm*—Oblon, Spivak, McClelland, Maier & Neustadt, P.C.

[57] ABSTRACT

Air is drawn into the crank chamber when the negative pressure is built up in the crank chamber, and the air mixed with the blowby drawn into the crank chamber is led as the secondary air to the exhaust gas discharge section when the positive pressure is built up in the crank chamber. Thus the secondary air is mixed with the exhaust gases discharged from the combustion chamber, and the mixture of the exhaust gases and the secondary air is burned again (oxidized) in the exhaust gas cleaning section, thereby cleaning up the exhaust gases. Furthermore, the present invention is provided with two valves for checking the back flow of the air while maintaining the air flow from the crank chamber to the exhaust gas discharge section. One valve (first valve) is disposed within the intake passage and opens when the negative pressure is built up in the crank chamber. The other valve (second valve) is disposed within the guide passage and opens when the positive pressure is built up in the crank chamber.

13 Claims, 3 Drawing Sheets

FOUR-STROKE-CYCLE ENGINE

BACKGROUND OF THE INVENTION

1. Field of the Invention

The present invention relates to a four-stroke-cycle engine for use mainly on a portable work machine and, more particularly, to a four-stroke-cycle engine equipped with an exhaust gas cleaning device which supplies secondary air to exhaust gases for re-combustion of the exhaust gases.

2. Description of Prior Art

A portable work machine such as a mower is generally mounted with a two-stroke-cycle engine as a power source which uses a mixture of fuel and lubricating oil, so that the work machine may be operated in various directions of tilt, or in all positions of operations.

In recent years, however, since it has become necessary to positively clean up exhaust gases in such a portable work machine, the mounting of a four-stroke-cycle engine having such an advantage that the exhaust gases contain little unburned components is considered. In this case, a problem lies in the weight and size of the four-stroke-cycle engine. That is, the four-stroke-cycle engine, requiring a valve mechanism as an essential component which is of complicated construction, heavy, and large in size, becomes so much heavier and larger in size than the two-stroke-cycle engine. This problem will become serious when the exhaust gas cleaning device is added to the engine. For example, it is assumed to adopt an exhaust reactor system or an oxidation catalytic system for cleaning up such unburned components in the exhaust gases as hydrocarbons and carbon monoxide. The exhaust reactor system and the oxidation catalytic system, as well known, are exhaust gas cleaning devices which supply the secondary air to an exhaust gas discharge section such as an exhaust port, and change the exhaust gases into harmless $H_2O$ and $CO_2$ by oxidation reaction at high temperatures. Therefore, when an exhaust gas cleaning device of the exhaust gas reactor system and the oxidation catalytic system to the engine, it becomes necessary to also use a special secondary air pump for supplying the secondary air, a gear and pulley for transmitting to the secondary air pump the torque of a crankshaft, and further a secondary air piping, which, however, will increase the size and weight of the engine. In a portable work machine whose weight must be supported by the operator, therefore, provided that the engine weight increases with the mounting of the secondary air pump, the burden on the operator also increases, resulting in a lowered handing performance.

Another problem arising in mounting the four-stroke-cycle engine on the portable work machine lies in that the lubricating oil to be applied to moving parts of the engine is likely to leak. That is, in the four-stroke-cycle engine the lubricating system includes an oil pan located below the crankcase, and in this oil pan is formed an oil reservoir. The oil pan is an essential component for the lubricating system regardless of the type of the lubricating system such as a dry sump type, a wet sump type, a forced-feed type, a splash type, etc. If a prior art four-stroke-cycle engine of known constitution is used on the portable work machine, the oil will leak from the oil pan if the portable work machine is tilted. During operation of the portable work machine, however, the machine body is often largely tilted. It is, therefore, inadequate to mount the four-stroke-cycle engine equipped with the oil pan of known construction on the portable work machine.

SUMMARY OF THE INVENTION

It is an object of the present invention to provide a four-stroke-cycle engine suitable for mounting on a portable work machine which will not increase weight and size if mounted with an exhaust gas cleaning device.

It is another object of the present invention to provide a four-stroke-cycle engine suitable for mounting on a portable work machine in which no oil leakage will occur if the engine is tilted.

It is a further object of the present invention to provide a four-stroke-cycle engine of simple construction which is capable of cleaning up exhaust gases.

The four-stroke-cycle engine of the present invention is equipped with an exhaust gas cleaning device which supplies the secondary air to the exhaust gases for re-combustion of the exhaust gases. The four-stroke-cycle engine has a basic constitution essential for successively performing a series of intake, compression, power and exhaust strokes which occur successively in a combustion chamber, and for changing the reciprocation of a piston produced by these strokes to a rotational motion and transmitting the rotational motion to a crankshaft. The four-stroke-cycle engine of the present invention is further provided with an intake passage which connects the closed crankcase containing the crankshaft to the atmosphere, a first valve which is disposed within the intake passage and opens when a negative pressure is built up in the crankcase as a result of the reciprocation of the piston, a guide passage which connects the crankcase with an exhaust gas discharge section to thereby guide the intake air as the secondary air from the crankcase to exhaust gas discharge section, a second valve which is disposed within the guide passage and opens when the positive pressure is built up within the crankcase by the reciprocation of the piston, and an exhaust gas cleaning section for re-burning the exhaust gases discharged from the exhaust gas discharge section and mixed with the secondary air. The pressure condition in the crankcase varies continuously between the negative pressure condition and the positive pressure condition according to the reciprocation of the piston. Therefore, when the negative pressure is present within the crankcase, the air is drawn into the crankcase via the intake passage. This air is mixed with blowby gases produced within the crankcase; and when the positive pressure is built up within the crankcase, the mixture of the air and the blowby gases is led to the exhaust gas discharge section through the guide passage. The exhaust gases discharged from the combustion chamber, including the secondary air, can be cleaned up by re-combustion.

DETAILED DESCRIPTION OF PREFERRED EMBODIMENT

Figure 1:
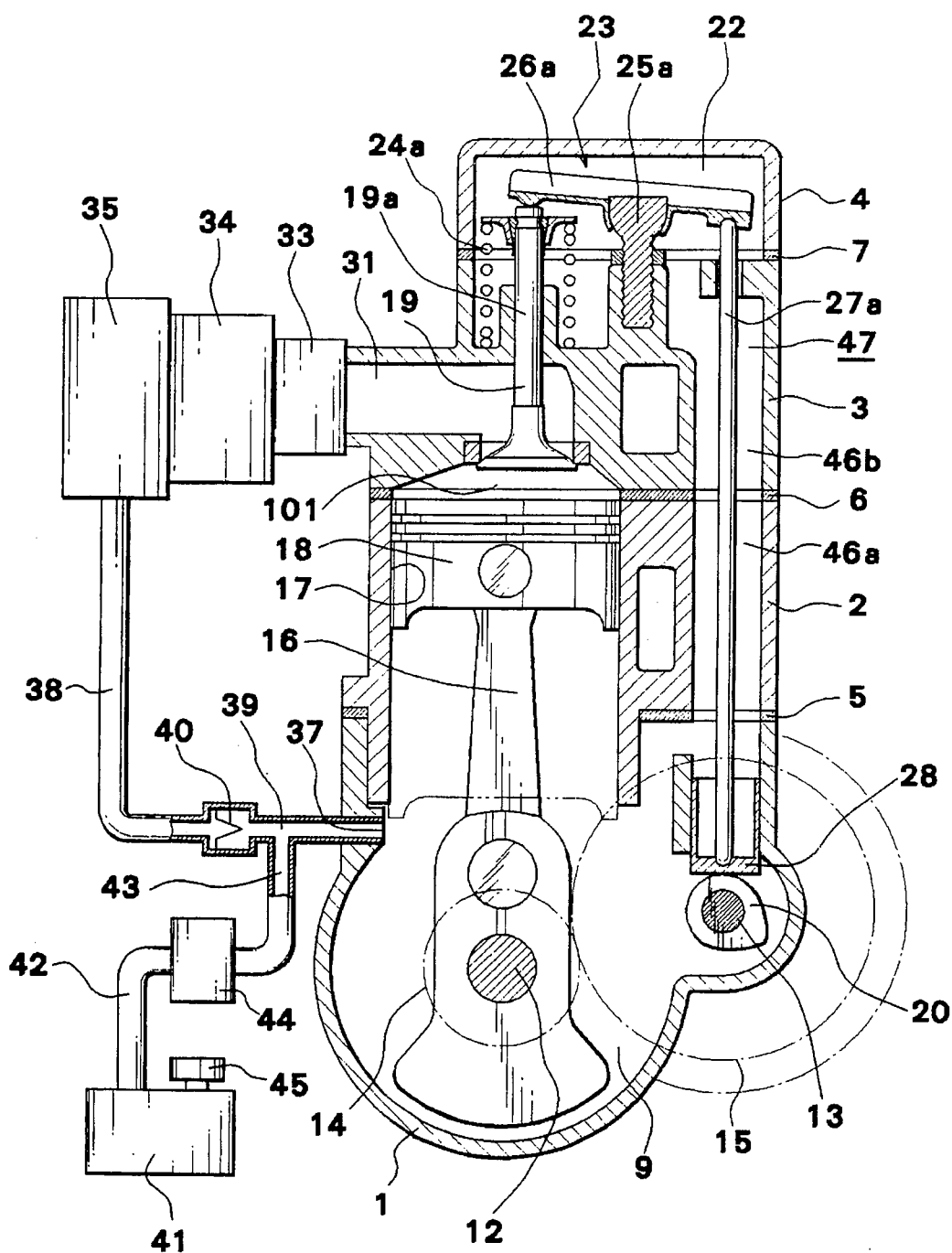
FIG. 1 is a longitudinal sectional front view of a four-stroke-cycle engine in one embodiment according to the present invention.
Figure 2:
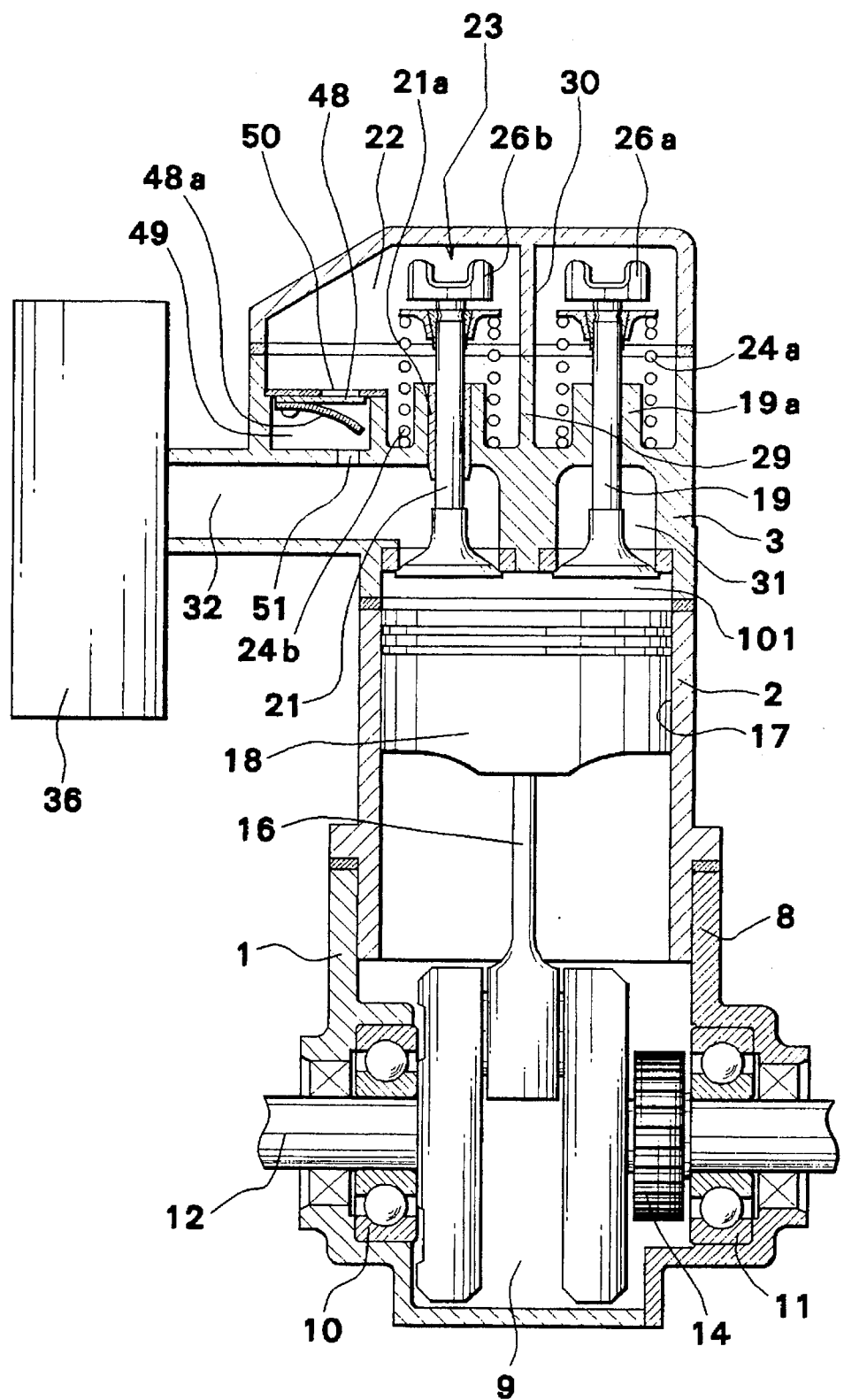
FIG. 2 is a longitudinal sectional side view thereof.

A preferred embodiment of the present invention will be explained with reference to the accompanying drawings. FIG. 1 is a longitudinal sectional front view showing the general construction of an overhead valve-type four-stroke-cycle engine to be mounted and used on a portable work machine or other; and FIG. 2 is a longitudinal sectional side view thereof. As is clear from FIGS. 1 and 2, the four-stroke-cycle engine in the present embodiment has a basic constitution necessary for successively performing a series of mixture intake, compression, power and exhaust strokes in a combustion chamber 101, changing the reciprocation of a piston 18 caused by a series of these strokes to a rotational motion, and transmitting the rotational motion to a crankshaft 12. The four-stroke-cycle engine in the present embodiment is also equipped with an exhaust gas cleaning device for supplying the secondary air to the exhaust gases to burn the exhaust gases again. Hereinafter, detailed description of the four-stroke-cycle engine in the present embodiment will be given.

On the upper part of the crankcase 1 is attached a cylinder block 2; a cylinder head 3 is mounted on the upper part of the cylinder block 2; and a rocker arm cover 4 is mounted on the upper part of the cylinder head 3. Between the crankcase 1 and the cylinder block 2 a first gasket 5 is interposed; the cylinder block 2 and the cylinder head 3 a second gasket 6 is interposed; and between the cylinder head 3 and the rocker arm cover 4 a third gasket 7 is interposed. Also as shown in FIG. 2 a crankcase cover 8 is attached on the side face of the crankcase 1; a crank chamber 9 is formed surroundedly of the crankcase 1 and the crankcase cover 8. This crank chamber 9 is formed as a closed space inside the four-stroke-cycle engine.

In the crank chamber 9 the crankshaft 12 supported at both ends on bearings 10 and 11 and a camshaft 13 supported at both ends on bearings, not shown, are housed with their centers of rotation arranged in parallel. On one end of the crankshaft 12 a crank gear 14 is fixedly installed, and on one end of the camshaft 13 a cam gear 15 is fixedly installed. The crank gear 14 and the cam gear 15 are in mesh. To the crankshaft 12 one end of a connecting rod 16 is connected. The other end of the connecting rod 16 is connected to the piston 18 slidably inserted in the cylinder 17 formed in the cylinder block 2. On the camshaft 13 are fixedly mounted an intake cam 20 which opens and closes an intake valve 19 and an exhaust cam, not shown, which opens and closes an exhaust valve 21.

The space covered with the rocker cover 4 above the cylinder head 3 serves as a valve mechanism housing space 22, within which a valve mechanism 23 which operates the intake valve 19 and the exhaust valve 21 is housed. The valve mechanism 23 is composed of springs 24a and 24b for pressing the intake valve 19 and the exhaust valve 21 toward closing, rocker arms 26a and 26b rockably mounted by adjusting screws 25a and 25b in contact with the tips of the intake valve 19 and the exhaust valve 21 respectively, and push rods 27a and 27b with one end of each of the rocker arms 26a and 26b held in contact with the other end thereof, respectively. The other ends of the push rods 27a and 27b are in contact with the outer peripheral surface of the intake cam 20 and the exhaust cam through a tappet 28. The cylinder head 3 and the rocker arm cover 4 are provided with partition plates 29 and 30 which separate the interior of the valve mechanism housing space into the intake valve 19 side and the exhaust valve 21 side.

In the cylinder head 3 are formed an intake port 31 for drawing the air-fuel mixture into the combustion chamber 101 and an exhaust port 32 which is an exhaust gas discharge section for discharging to the outside the exhaust gases produced in the combustion chamber 101. The intake port 31 is connected at the forward end to a carburetor 34 as a fuel supplying apparatus through an insulator 33. To the carburetor an air cleaner 35 as an air filter is connected. The exhaust port is connected at the forward end to an exhaust gas cleaning section 36 which serves as a muffler. For this exhaust gas cleaning section 36 an exhaust reactor or an oxidation catalyst is used.

The four-stroke-cycle engine of the present embodiment is provided with an air intake pipe 38 connected at one end to a communicating hole 37 formed in the crank chamber 9 and at the other end to the air cleaner 35. The interior of this air intake pipe 38 serves as an intake passage 39. In the air intake pipe 38 is inserted a first valve 40 which is disposed within the intake passage 39 to allow only the flow of the outside air (secondary air) from the communicating hole 37 into the crank chamber 9 in accordance with a pressure change in the crank chamber 9 caused by the reciprocation of the piston 18. That is, the first valve 40 is a valve designed to open only according to the condition of negative pressure in the crank chamber 9.

A lubricating system for lubricating each part of the four-stroke-cycle engine in the present embodiment will be explained. The lubricating system is of such a construction as to supply the oil for lubricating moving parts such as the crankshaft 12, etc. in a form of fine particles produced by an oil supply means, and to apply a mixture of the fine oil particles and blowby gases generated in the crank chamber 9 to the valve mechanism 23 in the crank chamber 9. That is, there is provided an oil tank 41 for reserving the lubricating oil to be applied to each part in the crank chamber 9 and to the valve mechanism 23. In a cap 45 of the oil tank 41 has a check valve, not shown, which is provided to prevent a pressure drop within the oil tank 41 with the fall of oil level in the oil tank 41. The oil tank 41 is connected to the intake passage 39 via an oil pipe 42 having an oil passage 43 inside and an oil pump 44 in the oil passage 43. Therefore, the intake passage 39 and the oil passage 43 are connected in one unit before connection with the crank chamber 9. The communicating hole 37 of the intake passage 39 which has been connected in one unit with the oil passage 43 is so formed as to come above any one of such moving parts as the crankshaft 12, the connecting rod 16, and the piston 18 if the four-stroke-cycle engine is tilted in any direction. Therefore, the oil supply means is constituted as a means for forming fine particles of oil produced by blowing the oil supplied to the intake passage 39 with the air passing inside the intake passage 39, for supplying the fine particles of oil into the crank chamber 9, and for striking the oil against the moving parts in the crank chamber 9 to scatter the oil in a form of further minute particles, which will then be supplied to these moving parts. In the lubricating system, the supply of the oil from inside the crank chamber 9 to the valve mechanism 23 is performed by communicating the crank chamber 9 with the valve mechanism 23. Details of the construction of the lubricating system will be described later.

The cylinder block 2 and the cylinder head 3 have spaces 46a and 46b formed for mounting push rods 27a and 27b, respectively. These spaces 46a and 46b communicate with the crank chamber 9 and the valve mechanism housing space 22. And a guide passage 47 is formed to guide the secondary air, that has entered the crank chamber 9 via the spaces 46a and 46b and the valve mechanism housing space 22, to the exhaust port 32.

Next, the cylinder head 3 has a valve mounting chamber 49 located in the guide passage 47; in this valve mounting chamber 49 is mounted a second valve 48. The second valve 48 is designed to open when the positive pressure is built up in the crank chamber 9, allowing only the discharge of the secondary air that has been guided into the valve mechanism housing space 22, into the exhaust port 32. In the guide passage 47, the valve mounting chamber 49 and the valve mechanism housing space 22 are connected by a passage hole 50, and the valve mounting chamber 49 and the exhaust port 32 are connected by a passage hole 51. The second valve 48 is located in a position where the passage hole 50 is opened and closed, restricting the maximum opening by means of a valve stopper 48*a*.

The four-stroke-cycle engine in the present embodiment is further provided with an ignition device, not illustrated. That is, in the cylinder head 3 a spark plug, not shown, is removably installed with a sparking section disposed within the combustion chamber; and an engine electrical system is dispersedly installed in each part to apply a high-tension voltage to the spark plug in synchronization with the valve opening operation of the intake valve 19 and the exhaust valve 21.

In the four-stroke-cycle engine of the aforesaid constitution, during operation, an air-fuel mixture is produced in the carburetor 34 by mixing the air that has passed through the air cleaner 35 and atomized fuel; the air-fuel mixture is drawn into the combustion chamber 101 through the intake port 31; and a series of mixture intake, compression, power and exhaust strokes repetitively occur in the combustion chamber, thus moving the piston 18 up and down. The reciprocation of the piston 18 at this time is transmitted to the crankshaft 12 via the connecting rod 16, thereby turning the crankshaft 12. At this time the output of the crankshaft 12 is partly utilized to drive the oil pump 44 of the lubricating system to thereby supply the lubricating oil to each section of the moving parts.

On the upward stroke of the piston 18 (compression and exhaust strokes), the negative pressure is built up in the crank chamber 9 to open the first valve 40 and at the same time the clean air cleaned up by the air cleaner 35 flows into the intake passage 39 and further into the crank chamber 9 through the communicating hole 37. The air that has flowed into the crank chamber 9 cools each part in the crank chamber 9. During the upstroke of the piston 18 the second valve 48 is held closed.

In the meantime, as the oil pump 44 is driven, the oil from the oil tank 41 flows in the oil passage 43, being discharged into the intake passage 39. The oil thus discharged into the intake passage 39 is blown by the secondary air flowing in the intake passage 39, becoming fine particles, which, together with the secondary air, is fed into the crank chamber 9 via the communicating hole 39. The quantity of oil thus supplied is of the order of 10 cc/h in a four-stroke-cycle engine of 20 to 30 cc displacement. The oil supplied into the crank chamber 9 is supplied in a form of fine particles into the crank chamber 9 through the communicating hole 37. Since the communicating hole 37 is formed so as to come to a position above one of such moving parts as the crankshaft 12, the connecting rod 16 and the piston 18 when the four-stroke-cycle engine is tilted in any direction, the oil supplied into the crank chamber 9 strikes on the crank weight and crank arm of the crankshaft 12, the large end of the connecting rod 16, and the skirt section of the piston 18, scattering in a form of fine particles. The fine oil particles thus scattering attach on the sliding and engaging sections of the moving parts in the crank chamber 9, thus insuring thorough lubrication to all moving parts.

Next, when the piston 18 is on the downstroke (intake and power strokes), the pressure in the crank chamber 9 rises to hold the first valve 40 in a closed position. Then, the air that has entered the crank chamber 9, including the oil in the scattered state and the blowby produced in the crank chamber 9, flows in the spaces 46*a* and 46*b* toward the valve mechanism space 22. In this case, with the pressure rise in the crank chamber 9, the pressure in the valve mechanism housing space 22 also increases, thus opening the second valve 48, while the air flows through the passage holes 50 and 51, being discharged as the secondary air into the exhaust port 32. The secondary air discharged into the exhaust port 32 flows into the exhaust gas cleaning section 36, being mixed with hot exhaust gases to thereby change harmful hydrocarbons and carbon monoxide in the exhaust gases into harmless $H_2O$ and $CO_2$. The oil and blowby gases contained in the secondary air are also burned (oxidized) within the exhaust gas cleaning section 36, being discharged in a form of $H_2O$ and $CO_2$.

A part of the oil flowing together with the secondary air into the valve mechanism housing space 22 flows into the intake port 31 from between the intake valve 19 and the valve guide 19*a*, or flows into the exhaust port 32 from between the exhaust valve 21 and the valve guide 21*a*. The oil that has entered the intake port 31 flows, together with the air-fuel mixture, for combustion into the combustion chamber 101, while the oil that has entered the exhaust port 32 flows, together with the exhaust gases, into the exhaust gas cleaning section 36 for burning.

Figure 3:
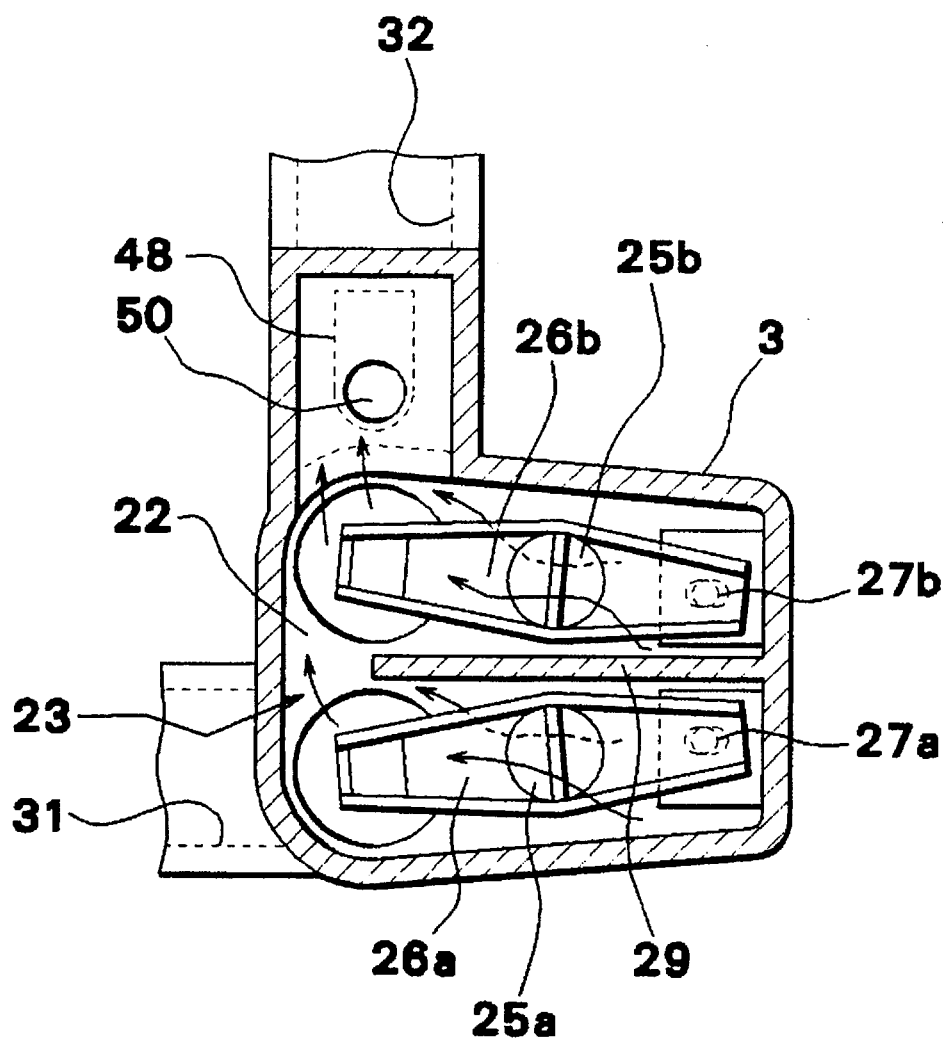
FIG. 3 is a horizontal sectional view showing the arrangement of a valve mechanism and a second valve.

The inflow of the secondary air inclusive of the oil into the valve mechanism housing space 22 enables to apply oil lubrication to the valve mechanism 23, and no special lubricating mechanism will be required for lubricating the valve mechanism. Moreover, because the valve mechanism housing space 22 is divided by partition plates 29 and 30 into the intake valve 19 side and the exhaust valve 21 side, the secondary air including the oil flows as indicated by an arrow in FIG. 3, thus well lubricating either of the intake valve 19 side and the exhaust valve 21 side. Furthermore, the oil supplied into the crank chamber 9 is gradually discharged together with the secondary air into the exhaust port 32 after lubrication of each moving part in the crank chamber 9 and the valve mechanism 23, and therefore the oil has no chance to accumulate much in the crank chamber 9 and accordingly will not leak from the crank chamber 9 if the four-stroke-cycle engine is tilted in any direction.

Furthermore, the secondary air that has entered the valve mechanism housing space 22 rises in temperature as a result of cooling each part in the crank chamber 9; however, since the valve mechanism housing space 22 located close to the combustion chamber 101 and the exhaust port 32 is at a higher temperature than the crank chamber 9, the secondary air can cool the valve mechanism 23. Consequently, cooling each part of the four-stroke-cycle engine with the secondary air can improve the durability and intake efficiency of the four-stroke-cycle engine.

In the meantime, the secondary air that has cooled each part in the crank chamber 9 and the valve mechanism 23, being at a substantially high temperature, will not excessively lower the temperature of the exhaust gases if discharged into the exhaust port 32. It is, therefore, possible to accelerate oxidation reaction by the secondary air at high temperatures.

As described above, the air drawn into the crank chamber 9 is supplied as the secondary air into the exhaust port 32, thereby realizing easy supply of the secondary air into the exhaust gases necessary for the exhaust gas cleaning device of the exhaust reactor system or the oxidation catalytic system without using a special part such as a secondary air pump. Therefore, it becomes possible to decrease the overall size and weight of the four-stroke-cycle engine, thus obtaining a four-stroke-cycle engine suitable for mounting on a portable work machine which requires the operator to support the weight thereof. In addition, the lubricating system in the present embodiment supplies fine particles of oil to the moving parts in the crank chamber 9, and also supplies the fine oil particles together with the blowby gases to the valve mechanism 23, while remaining oil is burned away in the combustion chamber 101 and in the exhaust reactor 36. Since no oil pan is needed in this type of engine, no oil leakage will take place if the portable work machine is largely tilted. Consequently, it is possible to acquire a four-stroke-cycle engine suitable for mounting on the portable work machine if the machine is tilted largely in the course of operation.

What is claimed is:

1. A four-stroke-cycle engine equipped with an exhaust gas cleaning device for supplying secondary air to exhaust gases for re-combustion of the exhaust gases, comprising:

a basic component for said four-stroke-cycle engine, which includes a piston reciprocatably inserted in a cylinder and connected by a connecting rod to a rotatable crankshaft, a combustion chamber hermetically positioning the head of said piston, a valve mechanism for driving an intake valve and an exhaust valve which respectively open and close an intake port and an exhaust port communicating with said combustion chamber, a fuel feed device which produces an air-fuel mixture by mixing fuel with the air drawn into said combustion chamber through the intake port, an ignition device for igniting to explode the air-fuel mixture that has been drawn in and compressed in said combustion chamber, and a lubricating system for supplying lubricating oil to each of the moving parts, so that said valve mechanism, said fuel feed device, and said ignition device will be operated at a specific timing to thereby continuously cause a series of intake of the mixture, compression, power and exhaust strokes in said combustion chamber, thus transmitting the reciprocation of said piston produced by a series of the strokes as a rotational motion to said crankshaft through the connecting rod;

an exhaust gas discharge section including the exhaust port;

a hermetically closed crank chamber for housing the crankshaft;

an intake passage connecting said crank chamber to the atmosphere;

a first valve disposed within said intake passage and designed to open by the reciprocation of said piston when a negative pressure has been built up in said crank chamber;

a guide passage connecting said crank chamber and said exhaust gas discharge section to guide the air as the secondary air from said crank chamber to said exhaust gas discharge section;

a second valve disposed within said guide passage and designed to open by the reciprocation of said piston when a positive pressure is built up in said crank chamber; and an exhaust gas cleaning section for re-combustion of exhaust gases discharged to said exhaust gas discharge section and mixed with the secondary air.

2. A four-stroke-cycle engine as recited in claim 1, wherein an air filter is mounted at the inlet port of said intake passage.

3. A four-stroke-cycle engine as recited in claim 2, wherein an air cleaner provided with a carburetor communicating with the intake port is used as said air filter.

4. A four-stroke-cycle engine as recited in claim 1, wherein said guide passage communicates with the exhaust port.

5. A four-stroke-cycle engine as recited in claim 1, wherein said lubricating system comprises:

an oil tank for reserving the lubricating oil;

an oil passage connected to said oil tank and said crank chamber of said engine; and an oil supply means for supplying the oil in a form of fine particles from said oil tank to moving parts in said crank chamber via said oil passage.

6. A four-stroke-cycle engine as recited in claim 5, wherein a valve mechanism housing space for housing said valve mechanism is formed as a closed space; said guide passage communicates with said exhaust gas discharge section via said valve mechanism housing space, and said second valve is disposed between said valve mechanism housing space and said exhaust gas discharge section.

7. A four-stroke-cycle engine as recited in claim 6, wherein said valve mechanism is of an overhead valve type with a camshaft thereof arranged within the crankcase, said guide passage is formed integrally with each block of said engine, and a push rod of said valve mechanism is arranged within said guide passage.

8. A four-stroke-cycle engine as recited in claim 5, wherein said oil supply means is composed of a means for mixing a liquid oil with gases flowing into said crank chamber and supplies the oil in a form of fine particles.

9. A four-stroke-cycle engine as recited in claim 8, wherein said intake passage and said oil passage are connected in one unit before connection with said crank chamber, and the air led in through the inlet port of said intake passage is used as a gas flowing into said crank chamber.

10. A four-stroke-cycle engine as recited in claim 6, wherein an air filter is mounted at the inlet port of said intake passage.

11. A four-stroke-cycle engine as recited in claim 10, wherein an air cleaner provided with a carburetor connected to the intake port is used as said air filter.

12. A four-stroke-cycle engine as recited in claim 1, wherein an exhaust reactor is used as said exhaust gas cleaning section.

13. A four-stroke-cycle engine as recited in claim 1, wherein an oxidation catalyst is used in said exhaust gas cleaning section.

* * * * *